United States Patent [15] 3,686,281
Knell et al. [45] Aug. 22, 1972

[54] PREPARATION OF POLYFLUOROALKYL ESTERS OF FUMARIC AND RELATED ACIDS

[72] Inventors: Martin Knell, 4 Possum Rd., Ossining, N.Y. 10562; Edward Berger, 698 Yonkers ave., 1

[22] Filed: June 2, 1969

[21] Appl. No.: 829,764

[52] U.S. Cl. ............................260/485 F, 117/139.5
[51] Int. Cl. .........................C07c 69/52, C07c 69/60
[58] Field of Search .........................260/485 F, 475

[56] References Cited

UNITED STATES PATENTS 2,610,205  9/1952  Trigg et al. .................260/475
3,148,207  9/1964  Weinkauff et al. ........260/485

Primary Examiner—Lorraine A. Weinberger
Assistant Examiner—E. Jane Skelly
Attorney—Karl J. Jorda and Bruce M. Collins

[57] ABSTRACT a process for the preparation of ester compounds of the formula:

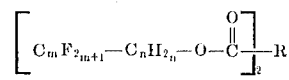

wherein $m$ is an integer of 3 to 18; $n$ is an integer of 2 to 10; and R is an ethylenically unsaturated hydrocarbon radical derived from fumaric, maleic, citraconic, mesaconic, or itaconic acid, which comprises reacting the compound $C_mF_{2m+1}\text{—}C_nH_{2n}X$ wherein $m$ and $n$ are as defined above, and X is iodine, bromine or chlorine with a mono ammonium salt of fumaric, maleic, citraconic, mesaconic, or itaconic acid. In preferred embodiment, the monotriethylammonium fumarate is reacted with 1,1,2,2-tetrahydroperfluoroalkyl iodide. Yields in excess of 50 percent are obtained. The esters prepared by the process of this invention form polymers which are useful in oil and water-repellent textile finishes.

21 Claims, No Drawings

PREPARATION OF POLYFLUOROALKYL ESTERS OF FUMARIC AND RELATED ACIDS

This invention concerns a process for the preparation of ester compounds of the formula:

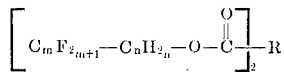  I wherein $m$ is an integer of 3 to 18, preferably 6 to 12 and most preferably 6 to 10; $n$ is an integer of 2 to 10 and is preferably 2 or 3, and most preferably 2; R is an ethylenically unsaturated hydrocarbon radical derived from fumaric, maleic, citraconic, mesaconic, or itaconic acid, preferably maleic or fumaric acid.

These compounds may be polymerized to polymers which are valuable in forming fabric finishes having excellent soil repellent properties. The oil and water repellent finishes of textiles treated with compositions containing such polymers are generally fast to repeated washing and dry-cleaning and thus retain their excellent soil repellency for long durations.

Particularly preferred polymers of a monomer which is prepared by the process of this invention are those of bis(1,1,2,2-tetrahydroperfluorononyl) fumarate.

The compounds for which the process of the present invention may be employed are the subject of co-pending application Ser. No. 720,370 filed Apr. 10, 1968 assigned to the assignee of the present application.

Up to the time of the present invention, methods used for the preparation of such compounds were often uneconomical and in some instances, required extremely long reaction times.

Generally, known processes for preparing the corresponding methacrylate esters from a perfluoroalkyl iodide and an alkali metal salt of the acids cannot be adapted to the preparation of the esters of Formula I because little or no product is obtained and/or special solvent systems are required.

The present invention comprises reacting a polyfluoroalkyl halide of the formula:

$$C_mF_{2m+1}\text{—}C_nH_{2n}X \qquad \text{II}$$

wherein $m$ and $n$ are as defined in Formula I and X is iodine, bromine, or chlorine, preferably iodine, with a mono ammonium salt of fumaric, maleic, citraconic, mesaconic, or itaconic acid wherein the amine is selected from the group consisting of di and trialkylamines wherein the alkyls are one to four carbon atoms in length, morpholine, N-loweralkylmorpholine, piperidine, triethylenediamine, aniline or dimethylaniline, and most preferred, a triethylamine; at a temperature from above the melting point of the reactants to approximately 200°C, from one-half hour to 30 hours. Where the term 'lower alkyl' is used, there is intended alkyl of one to four carbon atoms.

The polyfluoroalkyl halide used in the above formula may be prepared by procedures well known to those skilled in the art. For example, the preparation of polyfluoroalkyliodides of the above formula are disclosed in U.S. Pat. No. 3,145,222 Brace.

It is to be understood that the perfluoroalkyl group may be, and usually is, a mixture of different chain lengths since the basic starting materials are obtained by telomerization procedures which yield perfluoroalkyl halides of varying lengths. The starting compounds comprising a single chain length may readily be obtained if desired by separation or synthetic techniques well known to the art.

The salts of the acids employed may be prepared by mixing the acid with a stoichiometrically equivalent amount of the appropriate amine in water, acetone or methanol, heating to dissolve if necessary, and evaporating to dryness to recover the salt.

It is particularly surprising that completely unsatisfactory yields or extensive reaction times were required if the preparation of the desired esters was attempted from di salts of the acids, whereas employing the above mono amino salts, much higher yields were obtained and shorter reaction times could be employed. Also the necessity of any solvent was eliminated.

It is especially surprising that in most instances the di salt of the above amines and acids cannot be formed by the usual methods but only the mono salt is obtained even if excess amine is used. The overall scheme involving the process of the present invention can be exemplified by following the series of reactions employed in the preparation of the bis(1,1,2,2-tetrahydroperfluorononyl) fumarate from 1,1,2,2-tetrahydroperfluorononyl iodide and the monotriethylammonium salt of fumaric acid.

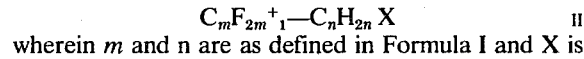

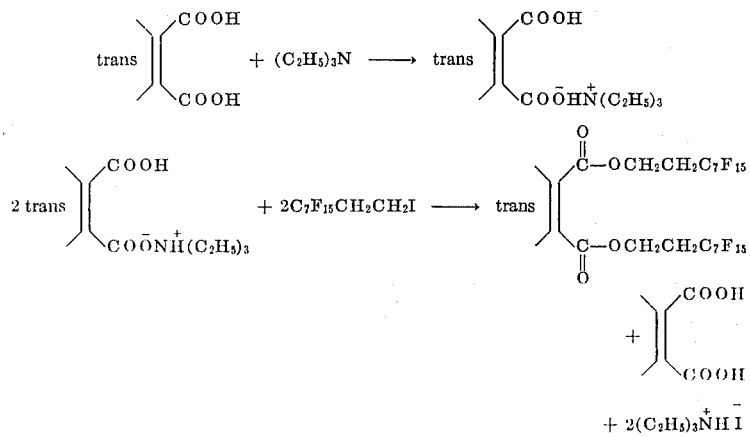

As mentioned above, the temperature can range from just above the melting point of the reactants to approximately 200°C. At lower temperatures, the reaction proceeds much more slowly and at the higher temperatures, some decomposition takes place. A generally suitable range of temperature is 100°–175°C and a preferred range is 125°–175°C. It has generally been found that the most desirable range is 140°–160°C.

The times of reaction may be varied between one-half hour to 30 hours. If a stoichiometric amount of the ammonium salt is employed, reaction times of approximately 20 to 25 hours are usually required. Surprisingly, however, it has been observed that if two to three times the required amount of the mono ammonium salt is employed, the reaction times are usually reduced to the order of 5 hours.

Also as indicated above, a primary advantage of the present invention is the elimination of the need for any solvent system. In some cases, we have found that slightly improved yields may be obtained by employing the desired product as a solvent, whereas other solvents do not appear to have any significant influence on yields when employing the process of the present invention.

The following examples describing certain representative embodiments of this invention will serve to further illustrate the nature of this invention. The examples are illustrative and intended to enable those skilled in the art to practice the invention in all of the embodiments flowing therefrom.

EXAMPLE 1

Bis (1,1,2,2-Tetrahydroperfluoroalkyl) Fumarate a. Monotriethylammonium Fumarate Three hundred forty-eight g (3.0 moles) of fumaric acid is slurried in 1050 ml of acetone, cooled to 15°C and 303 g (3.0 moles) of triethylamine added slowly with stirring and cooling so as to keep the temperature below 30°C. After the addition, stirring is continued for 1 hour, and the reaction mixture then filtered. After drying in a vacuum oven at 60°C, the monotriethylammonium fumarate weighs 640.0 g (98 percent yield) and melts at 90°–93°C.

b. Bis (1,1,2,2-Tetrahydroperfluoroalkyl) Fumarate

Eight hundred g (1.40 moles) of perfluoroalkyl iodide was mixed with 620 g (2.85 moles) of triethylammonium fumarate in a 2 liter flask equipped with stirrer, thermometer and condenser leading to a dry-ice trap. The apparatus is purged with nitrogen and then the reaction mixture heated with vigorous stirring at 135°–150°C for 9 ½ hours, after which a VPC of the lower layer shows no significant $R_fCH_2CH_2I$ remaining. While still at 150°C, the volatile olefins are distilled into the dry-ice cooled trap, first at atmospheric pressure and then at reduced pressure down to 2 mm. While still hot, the reaction mixture is poured into a separatory funnel and the bottom layer drawn off. The lower layer, which weighs 421.2 g is distilled in a molecular still at 150°C–160°C and 1 micron pressure. The cold finger condensing surface is kept at 80°C with a circulating constant temperature bath so as to keep the distillate liquid. The distillate, which consists of a mixture of fumarate diesters having $R_f$ chain lengths of $C_6$–$C_{12}$ weighs 340 g. On hydrolysis with 0.2 N aqueous potassium hydroxide, the resulting alcohol mixture has the following composition (extraction into chloroform and VPC analysis):

|  | Weight % |
|---|---|
| $C_6F_{13}CH_2CH_2OH$ | 30.4 |
| $C_8F_{17}CH_2CH_2OH$ | 39.5 |
| $C_{10}F_{21}CH_2CH_2OH$ | 27.9 |
| $C_{12}F_{25}CH_2CH_2OH$ | 2.2 |
| ave. M.W. of $R_fCH_2CH_2OH$ =452 | |
| ave. M.W. of fumarate diesters = 984 | |

The conversion of $R_fCH_2CH_2I$ to diester for the different chain lengths is approximately as follows:

| $R_f$ | Converted to Diester, % |
|---|---|
| $C_6F_{13}$– | 43.5 |
| $C_8F_{17}$– | 57.0 |
| $C_{10}F_{21}$– | 53.5 |
| $C_{12}F_{25}$– | 24.5 |

The overall conversion to the desired fumarate diester was 49.5 percent.

The perfluoroalkyl iodide employed boiled at 90°C/100 mm to 132°C/15 mm and was comprised of:

|  | Weight % |
|---|---|
| $C_6F_{13}CH_2CH_2I$ | 35.3 |
| $C_8F_{17}CH_2CH_2I$ | 33.4 |
| $C_{10}F_{21}CH_2CH_2I$ | 24.2 |
| $C_{12}F_{25}CH_2CH_2I$ | 4.45 |
| $C_{14}F_{29}CH_2CH_2I$ | 0.74 |
| 2 impurities | 1.86 |
| ave. M.W. of $R_fCH_2CH_2I$ = 561. | |

EXAMPLE 2

Bis (1,1,2,2-Tetrahydroperfluoroalkyl) Fumarate a. Monotriethylammonium

Six thousand gms (51.7 moles) of fumaric acid and 46,000 mls of anhydrous acetone are charged into a 20 gallon resin flask equipped with a stirrer, thermometer, pressure-equalized dropping funnel and cooling bath. The stirred suspension is cooled to 15°C and 5,225 gms (51.7 moles) of triethylamine added over a period of one-half to 1 hour while the temperature is maintained at 15°–20°C. An additional 4,000 mls of acetone are added to facilitate stirring, and stirring continued for an additional hour at room temperature. The suspension is filtered by suction and the fumarate salt washed three times with 4,000 mls of acetone and dried to constant weight at 40°C in vacuo. The product obtained is a white crystalline solid, m. p. 91°–94°C with a 97 percent yield. Perchloric acid titration of a sample of the fumarate salt gives a neutral equivalent of 218.8, calculated 217.

b. Bis (1,1,2,2-Tetrahydroperfluoroalkyl) Fumarate

Eight thousand nine hundred forty-two gms (15.1 moles) of 1,1,2,2-tetrahydroperfluoroalkyl iodide and 6,500 gms (30 mols) of triethylammonium fumarate are charged into a 22 liter, 3-neck round bottom flask fitted with a bottom stopcock and equipped with a stirrer, thermometer, nitrogen inlet tube, reflux condenser, and heating mantles. The reaction mixture is heated with stirring to 140°C over 1 hour under a very slow stream of nitrogen and stirred at 145°±5°for 23–24 hours. After 21–22 hours, a sample of the lower layer by VPC indicates less than 2 percent of the starting iodide remaining. After 23–24 hours, stirring is stopped and the two dark molten phases allowed to separate into layers over a period of 10–15 minutes.

The clear, dark brown lower layer amounting to 7,164 gms is drawn off fairly rapidly into a 12 liter, 3-neck round bottom flask. The volatile olefins formed by dehydrohalogenation of $R_fCH_2CH_2I$ to $R_fCH = CH_2$ are stripped off at 5 mm and a bath temperature of 95°–100b$LC$ over a period of 2–3 hours. The crude fumarate diesters are obtained, at room temperature, as a brown, waxy solid weighing 5,094 gms.

Half of the crude product, 2,540 gms, is distilled at high vacuum through a short (8 inch) insulated column without a condenser. The main fraction, boiling at 138°–214°/0.02–0.03 mm and weighing 1,868 gms, is obtained on cooling as a yellow solid.

The once distilled fumarate diester mixture is further purified as follows: The product weighing 1,868 gms is melted and poured at 100°–110°C into 2,000 mls of dimethylformamide at room temperature with rapid hand stirring. The mixture is cooled in ice water to 15°C, then filtered by suction and sucked as dry as possible. The wet filter cake without washing is remelted in a 4 liter resin flask and poured into 2,000 mls of benzene with hand stirring, cooled to 15°C as before, and the crystallized solid refiltered. The product is washed twice with 1,000 mls of benzene and dried in vacuo at room temperature to constant weight. The purified diester mixture is obtained as an almost colorless, waxy, granular solid weighing 1,442 gms. The purified product, 1,432 gms, is finally redistilled and the fraction boiling at 144°–176°/0.02 mm collected as bis (1,1,2,2-tetrahydroperfluoroalkyl) fumarate, a white waxy solid at room temperature, weight 1,369 gms.

The other half of the crude product, 2,540 gms, is distilled, boiling point 150°–185°/0.03 mm, yielding 1,970 gms; washed and dried as described above but with benzene only, giving 1,725 gms; and finally redistilled to yield 1,540 gms of bis (1,1,2,2-tetrahydroperfluoroalkyl) fumarate, boiling point 150°–182°/0.02 mm. The total weight of the fumarate diesters is 2,909 gms.

A repeat preparation carried out with 14.9 moles (8,814 gms) of 1,1,2,2-tetrahydroperfluoroalkyl iodide gave 2,821 gms of product.

The preparation of the monotriethylammonium fumarate is repeated by reacting 1 equivalent of fumaric acid and 2 equivalents of triethylamine in methanol. A sample of the product is titrated with perchloric acid and gives a neutral equivalent of 221. The calculated equivalent of the mono salt is 217, that of the di salt 159.

Analysis for $C_{10}H_{18}N_1O_4$
Calc.: C, 55.2 ; H, 8.84; N, 6.45
Found: C, 55.01; H, 8.86; N, 6.55

EXAMPLE 3

Bis (1,1,2,2-Tetrahydroperfluoroalkyl) Fumarate a. Monotriethylammonium fumarate Six thousand gms (51.7 moles) of fumaric acid and 40,000 mls of acetone are mixed in a stirred suspension, cooled to 15°C and 5,225 gms (51.7 moles) of triethylamine added over a period of one hour while the temperature is maintained at 15°–20°C. An additional 10,000 mls of acetone were added to facilitate stirring since the suspension becomes quite thick toward the end of the addition of triethylamine. Stirring is continued for 1 hour after the addition is complete, and the suspension filtered by suction. The filter cake is washed three times with 4,000 mls of acetone and dried to constant weight at 40°C in vacuo. The product obtained is a white crystalline solid weighing 11,003 gms, 98 percent of theory, m.p. 91°–94°C.

b. Bis (1,1,2,2-Tetrahydroperfluoroalkyl) Fumarate

Ten thousand gms (17 moles) of 1,1,2,2-tetrahydroperfluoroalkyl iodide are heated to 80°–90°C and together with 7,260 gms (33.4 moles) of triethylammonium fumarate are heated together with efficient stirring to 140°C over 1½ hours under a very slow stream of nitrogen and stirred at 145±5° for 23–24 hours. After 21–22 hours, a sample of the lower layer by VPC indicates less that 1% of the starting iodide remaining. After 23–24 hours, stirring is stopped and the two dark molten phases allowed to separate into layers over a period of 10–15 minutes. The clear, dark brown lower layer amounting to 7,888 gms is drawn off slowly. The volatile olefins are stripped off at 5 mm and a bath temperature of 90°–100°C over a period of 2–3 hours. The residue, consisting of crude fumarate diesters is obtained as a brown, waxy solid weighing 5,462 gms.

Half of the crude product, 2,778 gms, is distilled at high vacuum through a short (8 inch) insulated column without a condenser. After the collection of 257 g of forerun, b. p. 30°–147°/0.02 mm, the main fraction, boiling at 152°–203°/0.02 mm and weighing 2,082 gms is obtained on cooling as a yellow solid containing dark colored impurities which codistilled. The second half of the crude product, 2,675 gms, is distilled in the same way to yield 2,075 gms of a main fraction, b. p. 155°–195°/0.03 mm.

The once distilled fumarate diester is further purified as follows: The two main fractions are melted, combined (total 4,157 gms), and poured at 100°–110°C into 4,000 mls of dimethylformamide at room temperature with rapid hand stirring. The mixture is cooled in ice water to 15°C, then filtered by suction. The wet filter cake, without washing, is remelted in a 5 liter resin flask and poured into 4,000 mls of benzene with hand stirring, cooled to 15°C as before, and the crystallized solid refiltered. The filter cake is triturated with 3,000 mls of benzene at room temperature, again filtered, washed with 2,000 mls of benzene and dried in vacuo at room temperature to constant weight. The purified diester mixture is obtained as an almost colorless, waxy, granular solid weighing 3,023 gms. The purified product, 3,013 gms, is finally redistilled in two portions to yield 1,429 gms, b. p. 150°–185°/0.02 mm and 1,412 gms, b. p. 153°– 195°/0.01 mm, total, 2,841 gms (32 percent of theory), of bis (1,1,2,2-tetrahydroperfluoroalkyl) fumarate obtained as a white waxy solid at room temperature.

EXAMPLE 4

Bis (1,1,2,2,3,3-Hexahydroperfluorodecyl) Fumarate a. 1,1,2,3,3-Pentahydro-2-Iodoperfluorodecyl Acetate 99.2 g of perfluoroheptyliodide, 20.0 g of allyl acetate, and 0.2 g of azobisisobutyronitrile are heated at 80°C with stirring for 6 hours. After 2 and 4 hours respectively, additional 0.2 g quantities of the azobisisobutyronitrile catalyst are added. The reaction mixture is then cooled to room temperature and distilled through a small spinning band column under reduced pressure. The portion boiling at 68°–72°C/.05–.002 mm contains approximately 90 percent of pure product.

b. 1,1,2,3,3-Pentahydroperfluorodecene

Nineteen g of zinc dust and 20 ml of anhydrous ethanol are added to a 500 ml flask and stirred rapidly while 10 ml of 36 percent hydrochloric acid are added. The reaction mixture is heated to 60°C and 50.0 g of 1,1,2,3,3-pentahydro-2-iodoperfluorodecyl acetate added with 100 ml of anhydrous ethanol. The addition of the acetate takes approximately 45 minutes. The reaction mixture is continuously stirred for an additional 2½ hours and the temperature maintained at 60°C. Thereafter the reaction mixture is cooled to room temperature, the unreacted zinc is filtered off and the product extracted with 1,500 ml of water. The extracted layer is dried over molecular sieve and then distilled through an 18 inch spinning band column. 19.6 g of product boiling at 142°–144°C/760 mm is obtained.

Analysis for $C_{10}H_5F_{15}$
Calc.: C, 29.35; H, 1.12; F, 69.49
Found: C, 29.35; H, 1.32; F, 70.17 c. 1,1,2,2,3,3-Hexahydroperfluoro-1-Bromodecane 15.6 g of 1,1,2,3,3-pentahydroperfluorodecene are added to a quartz glass Fischer Porter tube and brought to boiling to remove any possible trapped air. It is then cooled to the temperature of liquid nitrogen and 7.0 g of dry hydrogen bromide added and the tube closed. The reaction mixture is allowed to warm to room temperature and it is then placed 15 centimeters from a 250 watt UV light source for 4½ hours. The excess hydrogen bromide is permitted to escape and the product is then washed with 50 ml of water to remove any trapped hydrogen bromide. It is then washed with 25 ml of a 10 percent solution of sodium thiosulfate and dried over molecular sieve, for four hours. Distillation yields a product boiling mainly at 95°–96°C/24 mm.

Analysis for $C_{10}H_6BrF_{15}$
Calc.: C, 24.46; 1.23; Br, 16.27; F, 58.04
Found: C, 24.31; H, 1.27; Br, 17.50; F, 58.10 d. Bis (1,1,2,2,3,3-Hexahydroperfluorodecyl) Fumarate 14.7 g of 1,2,2,3,3-hexahydroperfluoro-1-bromodecane and 13.0 g of monotriethylammonium fumarate are charged to a reaction flask and heated with constant stirring at 150°C for 7 hours. Thereafter volatiles are stripped off and the reaction mixture cooled to room temperature. The product is extracted with chloroform and washed with water to remove the triethylammonium hydrobromide salt. Thereafter the chloroform is stripped off in a rotary evaporator. The product is distilled, yielding 8.65 g, boiling at 190°–195 °C/100 mm. The melting point is 75°–78°C.

Analysis for $C_{24}H_{14}F_{30}O_4$
Calc.: C, 30.78; H, 1.51; F, 60.87
Found: C, 31.08; H, 1.62; F. 60.83

EXAMPLE 5

Bis (1,1,2,2-Tetrahydroperfluorononyl) Fumarate a. 1,1,2,2-Tetrahydro-1-Bromoperfluorononane 52.4 g of 1,1,2,2-tetrahydro-1-iodoperfluorononane, 17.6 g of bromine, and 0.5 g of benzoyl peroxide are charged into a Fischer Porter tube equipped with a magnetic up and down stirrer. The reaction mixture is heated with constant stirring to 90°–95°C for 1½ hours. An additional 9.6 g of bromine and 0.2 g of benzoyl peroxide are added and the reaction continued for an additional 4 hours. The product is washed with a solution containing 49.6 g of sodium thiosulfate and 500 ml of water. The lower layer is isolated and distilled in an 18 inch spinning band column. The product collected has a boiling point of 78°–80°C/25 mm.

Analysis for $C_9H_4BrF_{15}$
Calc.: C, 22.71; H, 0.84; F, 59.74; Br, 16.75
Found: C, 22.41; H, 0.81; F, 60.64; Br, 17.39 b. Bis (1,1,2,2-Tetrahydroperfluorononyl) Fumarate 23.85 g of 1,1,2,2-Tetrahydro-1-bromoperfluorononane and 21.7 g of monotriethylammonium fumarate are reacted under nitrogen with constant stirring at 150°C for 8 hours. The reaction mixture is stripped of volatiles at 150°C under a pressure of 5 mm. The remaining reaction mixture is washed with water and chloroform. The chloroform is stripped off in a rotary evaporator and the remaining solid is distilled as follows:

| Fraction | Boiling Point | Pressure | Weight |
|---|---|---|---|
| 1 | 25–65°C | 100 mm | 1.2 |
| 2 | 65–103°C | 100 mm | 1.8 |
| 3 | 153–194°C | 100 mm | 10.2 |

VPC shows cut no. 1 comprised 68% product; cut no. 2 comprised 78.9 percent product; and cut no. 3 comprised 92.9 percent product. Yield: 52 percent.

EXAMPLE 6

Bis 1,1,2,2-Tetrahydroperfluorononyl Itaconate a. Monotriethylammonium Itaconate 13.0 g (0.1 moles) of itaconic acid is dissolved in methanol and thereafter neutralized with 10.1 g (0.1 mole) of triethylamine and the solution evaporated to dryness. The liquid residue is dried in a vacuum desiccator for about 20 hours. It is titrated with 0.0991 normal perchloric acid to give an equivalent weight of 260.5 (theoretical 231)

b. Bis 1,1,2,2-Tetrahydroperfluorononyl Itaconate 21.0 g (.04 mole) of 1,1,2,2-tetrahydroperfluorononyl iodide and 18.5 g (.08 mole) of monotriethylammonium itaconate from (a) are stirred together for 1½ hours at 140°C. VPC indicates 21.6 percent of the diester is formed. After 11¾ hours of heating at 140°C, VPC indicates 48.5 percent conversion to the diester. The volatiles are removed at 140°C/5 mm. The bottom layer is separated and weighs 6.6 g. The top layer is extracted with water and chloroform and washed with water three times. Thereafter the chloroform is distilled off leaving 5.3 g of residue which by VPC comprises 72 percent diester. This was mixed with 6.6 g of the bottom layer and distilled at .030 mm over 95°C to 195°C, yielding by VPC a total of 33.6 percent of the diester.

EXAMPLES 7 – 17

In the following examples, the procedure employed in the foregoing examples 1 - 6 is repeated employing the indicated amounts of 1,1,2,2-perfluorononyl iodide and the particular fumarate salt listed. The solvent, temperature, reaction time, the amount of diester formed as indicated by VPC, and the isolated yield are also indicated in the following TABLE I.

TABLE I

| Example number | Fumarate salt Mole $C_7F_{15}CH_2CH_2I$ | Type | Moles | Solvent | Reaction temperature, °C. | Reaction time, hrs. | Diester formed, percent by VPC | Isolated yield |
|---|---|---|---|---|---|---|---|---|
| 7 | .04 | Mono($C_2H_5$)$_3$N | .08 | Product | 150 | 8 | 67 | 38 |
| 8 | .05 | Mono($C_2H_5$)$_3$N | .10 | Trifluorotoluene | 150 | 7½ | 38 | 25 |
| 9 | .02 | Mono($C_2H_5$)$_3$N | .022 | None | 170 | 30 | 66 | 30 |
| 10 | .06 | Mono($C_2H_5$)$_3$N | .08 | do | 150 | 26 | 60 | 51 |
| 11 | .04 | Mono($C_2H_5$)$_3$N | .045 | do | 150 | 11½ | 72 | 52.5 |
| 12 | .05 | Mono($C_2H_5$)$_3$N | .08 | do | 130 | 6½ | 47 | 28.2 |
| 13 | .06 | Mono piperidine | .09 | do | 150–155 | 30 | 71 | 53.8 |
| 14 | .06 | Mono($C_2H_5$)$_3$N | .12 | do | 150 | 5½ | 64 | 49.8 |
| 15 | .06 | Mono($C_2H_5$)$_3$N | .12 | do | 150 | 5½ | 65 | 48.5 |
| 16 | .06 | Mono($C_2H_5$)$_3$N | .175 | do | 100 | 25 | 62 | 44.0 |
| 17 | .06 | Mono($C_2H_5$)$_3$N | .15 | do | 125 | 19 | 66 | 54.5 |

EXAMPLES 18 – 27

In Examples 18 - 27, also following the general method set forth in previous examples, the following iodides and salts indicated in TABLE II are reacted employing the solvents, times and temperatures indicated in TABLE II. In each instance, very satisfactory yields of the desired ester are obtained.

TABLE II

| Example number | Iodide | Acid salt | Solvent | Temperature | Time |
|---|---|---|---|---|---|
| 18 | $(CF_3)_2CFCH_2CH_2I$ | Mono-N-methyl morpholine of maleic acid | Product | 200° | 30 min. |
| 19 | $(CF_3)(CF_2)_6(CH_2)_4I$ | Mono-tributyl ammonium citraconate | do | 125° | 4 hrs. |
| 20 | $(CF_3)_2CF(CF_2)_4(CH_2)_{10}I$ | Mono-dimethyl ammonium mesaconate | Trifluorotoluene | 135° | 5 hrs. |
| 21 | $CF_3(CF_2)_6CH_2CH_2CH_2I$ | Mono-piperidine salt of itaconic acid | Product | 175° | 20 hrs. |
| 22 | $CF_3(CF_2)_4CH_2CH_2I$ | Mono-aniline salt of fumaric acid | 1-octanol | 150° | 30 hrs. |
| 23 | $CF_3(CF_2)_6CH_2CH_2I$ | Mono-tripropylammonium salt of fumaric acid | Diglyme | 140° | 25 hrs. |
| 24 | $CF_3(CF_2)_6CH_2CH_2I$ | Mono-triethylammonium salt of mesaconic acid | Product | 180° | 10 hrs. |
| 25 | $(CF_3)_2CF(CF_2)_6CH_2CH_2I$ | Mono-diethylammonium salt of fumaric acid | t-Amyl alcohol | 160° | 5 hrs. |
| 26 | $CF_3(CF_2)_6CH_2CH_2I$ | Mono-triethylammonium fumarate | Dimethyl formamide | 150° | 8 hrs. |
| 27 | $CF_3(CF_2)_{10}CH_2CH_2CH_2I$ | Mono-triethylammonium fumarate | Ethylene glycol | 100° | 5 hrs. |

WE CLAIM:

1. A process for the preparation of an ester compound of the formula:

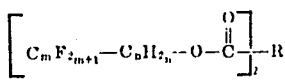

$$\left[ C_mF_{2m+1}-C_nH_{2n}-O-\overset{O}{\underset{\|}{C}}- \right]_2 R$$

wherein
m is an integer of 3 to 18;
n is an integer of 2 to 10;
R is an ethylenically unsaturated hydrocarbon radical derived from fumaric, maleic, citraconic, mesaconic, or itaconic acid, which comprises reacting a polyfluoroalkyl halide of the formula $C_mF_{2m}{}^+L-C_nH_{2n}X$ wherein m and n are as defined above, and X is iodine, bromine, or chlorine with a mono ammonium salt of fumaric, maleic, citraconic, mesaconic, or itaconic acid formed from the acid and an amine, wherein the amine is selected from the group consisting of di and triloweralkylamines wherein the alkyls are 1-4 carbon atoms in length, morpholine, N-loweralkylmorpholine, piperidine, triethylenediamine, aniline, or dimethylaniline, at a temperature from above the melting point of the reactants to 200°C.

2. A process as claimed in claim 1 wherein the reaction time is from one-half hour to 30 hours.

3. A process as claimed in claim 1 wherein said temperature is in the range of 100°C to 175°C.

4. A process as claimed in claim 1 wherein said temperature is in the range of 125°C to 175°C.

5. A process as claimed in claim 1 wherein said temperature is in the range of 140°C to 160°C.

6. A process as claimed in claim 1 wherein said amine is triethylamine.

7. A process as claimed in claim 1 wherein said acid is fumaric.

8. A process as claimed in claim 1 wherein said halide is a polyfluoroalkyliodide.

9. A process as claimed in claim 1 wherein n is 2, said acid is fumaric, and said temperature is in the range of 100°C to 175°C.

10. A process as claimed in claim 9 wherein said amine is a trialkylamine.

11. A process as claimed in claim 9 wherein said amine is a triethylamine.

12. A process as claimed in claim 1 wherein an excess of the equivalent amount of the salt is employed.

13. A process as claimed in claim 4 wherein two to three times the equivalent amount of the salt is employed.

14. A process as claimed in claim 11 wherein two to three times the equivalent amount of the salt is employed.

15. A process as claimed in claim 11 wherein said temperature is in the range of 140°C to 160°C.

16. A process as claimed in claim 11 wherein said halide is a polyfluoroalkyliodide.

17. A process as claimed in claim 16 wherein m is 6 to 12.

18. A process as claimed in claim 4 wherein m is 6 to 12, n is 2, X is iodine, said acid is fumaric, and said amine is a trialkylamine.

19. A process as claimed in claim 18 wherein said temperature is in the range of 140°C to 160°C and said amine is triethylamine.

20. A process as claimed in claim 16 wherein two to three times the equivalent amount of the salt is employed.

21. A process as claimed in claim 18 wherein an excess of the equivalent amount of the salt is employed.

* * * * *